(12) United States Patent
Fan et al.

(10) Patent No.: US 12,472,710 B2
(45) Date of Patent: Nov. 18, 2025

(54) MICROLENS ARRAYS AND METHOD FOR FABRICATING THE SAME

(71) Applicant: Suzhou Han Hua Semiconductor Co., Ltd, Jiangsu (CN)

(72) Inventors: Qian Fan, Suzhou (CN); Xianfeng Ni, Suzhou (CN)

(73) Assignee: SUZHOU HAN HUA SEMICONDUCTOR CO., LTD., Jiangsu (CN)

( * ) Notice: Subject to any disclaimer, the term of this patent is extended or adjusted under 35 U.S.C. 154(b) by 133 days.

(21) Appl. No.: 18/603,390

(22) Filed: Mar. 13, 2024

(65) Prior Publication Data
US 2024/0319411 A1    Sep. 26, 2024

(30) Foreign Application Priority Data
Mar. 22, 2023    (CN) .......................... 202310282839.8

(51) Int. Cl.
B29D 11/00    (2006.01)
G02B 3/00    (2006.01)

(52) U.S. Cl.
CPC ...... *B29D 11/00365* (2013.01); *G02B 3/0025* (2013.01); *G02B 3/0031* (2013.01); *B29K 2883/00* (2013.01)

(58) Field of Classification Search
CPC ............ B29D 11/00365; G02B 3/0031; G02B 3/0025
See application file for complete search history.

(56) References Cited

U.S. PATENT DOCUMENTS 3,591,468 A * 7/1971 Nishio et al. .......... C25D 5/605
                                                          205/917
5,871,653 A    2/1999 Ling
(Continued)

FOREIGN PATENT DOCUMENTS

CN    102096123 A    6/2011
CN    102967890 A    3/2013
CN    103353627 A    10/2013
(Continued)

OTHER PUBLICATIONS

Search Reports dated Sep. 6, 2023, issued in counterpart CN Patent Application No. 202310282839.8, w/ English translation (6 pages).
(Continued)

*Primary Examiner* — Mathieu D Vargot
(74) *Attorney, Agent, or Firm* — WHDA, LLP

(57) ABSTRACT

A method for fabricating a microlens array includes: step S1, providing a first substrate, and forming a patterned mask layer on the first substrate; step S2, etching the first substrate to form spaced grooves; step S3, removing the patterned mask layer; step S4, attaching a photoresist layer to the upper surface of the first substrate; step S5, softening the photoresist layer so that it adheres to the inner wall of the groove to form a concave smooth surface; step S6, solidifying the photoresist layer to form a working mold; applying an adhesive material and the working mold through the second substrate. The microlens array is produced by pressing the mold together or injecting PDMS material into the surface of the working mold.

12 Claims, 5 Drawing Sheets

(56) References Cited

U.S. PATENT DOCUMENTS

| | | | | |
|---|---|---|---|---|
| 5,958,469 A | * | 9/1999 | Richards | G02B 5/1852 |
| | | | | 425/808 |
| 6,876,051 B2 | * | 4/2005 | Ushijima | H10F 39/8063 |
| | | | | 257/E27.152 |

FOREIGN PATENT DOCUMENTS

| | | |
|---|---|---|
| CN | 103668130 A | 3/2014 |
| CN | 110244394 A | 9/2019 |
| CN | 110441838 A | 11/2019 |
| CN | 111175861 A | 5/2020 |
| CN | 113703081 A | 11/2021 |
| CN | 114296161 A | 4/2022 |
| CN | 116224476 A | 6/2023 |
| JP | 2002-113724 A | 4/2002 |
| KR | 2003-0019654 A | 3/2003 |

OTHER PUBLICATIONS

First Office Action dated Sep. 6, 2023, issued in counterpart CN Patent Application No. 202310282839.8, w/ English translation (8 pages).

Notification to Grant Patent Right for Invention dated Jan. 30, 2024, issued in counterpart CN Patent Application No. 202310282839.8, w/English translation (3 pages).

* cited by examiner

MICROLENS ARRAYS AND METHOD FOR FABRICATING THE SAME

CROSS-REFERENCE TO RELATED APPLICATIONS

This application claims benefit of the filing date of Chinese Patent Application No. 202310282839.8 filed on Mar. 22, 2023, the disclosure of which is hereby incorporated in its entirety by reference.

TECHNICAL FIELD OF THE INVENTION

The invention relates to the technical field of semiconductor device manufacturing processes, and more particularly to a microlens array and method for fabricating the same.

BACKGROUND OF THE INVENTION

Microlens array is an array device composed of lenses with dimensions at the micron level. It has the advantages of small size and light weight and can realize new functions such as miniaturization, array, integration, imaging, and wavefront conversion that are difficult to achieve with ordinary optical elements. Microlens array components have been widely used in image sensors, lasers, displays, and light field chips, and other applications.

At present, the traditional manufacturing method of a microlens array is to first form a master mold, that is, to spin-coat photoresist on the substrate, and then use a thermal reflow method or a grayscale exposure method to make microlens patterns on the photoresist layer, and then to pass it through dry etching transfers the photoresist pattern to the substrate. Then, a photosensitive polymer material is evenly coated on the master mold, and cured under pressure and ultraviolet (UV) light to form a working mold attached to the master mold. After peeling off the working mold, the working mold is used to heat-emboss polydimethylsiloxane (PDMS) material to form a microlens array. Using traditional methods, the process of making microlenses requires two mold flips, which are cumbersome steps and have low process consistency and reliability. More importantly, due to the coating thickness and uniformity of the photoresist during the production of the master mold, the sagittal height of the produced lens is often relatively small, which limits some applications.

SUMMARY OF THE INVENTION

The purpose of the present disclosure is to provide a microlens array and a manufacturing method thereof to solve the problems of traditional microlens manufacturing steps, such as cumbersome manufacturing steps, low process consistency and reliability, and small lens sagittal height.

In order to solve the above technical problems, the invention provides a microlens array manufacturing method, which comprises:

step S1, providing a first substrate, and form a patterned mask layer on the first substrate;
step S2, etching the first substrate to form spaced grooves;
step S3, removing the mask layer;
step S4, attaching a photoresist layer to the upper surface of the first substrate;
step S5, softening the photoresist layer so that it adheres to the inner wall of the groove to form a concave smooth surface;
step S6, solidifying the photoresist layer to form a working mold;
step S71 or step S72;
among them, step S71 includes: providing a second substrate, coating an adhesive material on the second substrate; turning the second substrate over, and pressing it with the working mold; UV curing the adhesive material, separating the second substrate from the working mold, and forming a microlens array on the surface of the second substrate;
step S72 includes: injecting PDMS material into the surface of the working mold, peeling it off after solidification, and forming a microlens array on the surface of the PDMS material.

Preferably, the thickness of the mask layer is 1 μm to 10 μm, and the material of the mask layer is photoresist, silicon oxide, metal or a combination thereof.

Preferably, the material of the first substrate is silicon, and the step S2 uses a plasma deep silicon etching method to etch the first substrate, and the vertical depth of the formed groove is 20 μm to 190 μm, with the inclination angle of the groove side wall relative to the bottom wall being 80 degrees to 100 degrees.

Preferably, the step S3 uses solvent cleaning or wet etching to remove the mask layer.

Preferably, the thickness of the photoresist layer is 10 μm to 50 μm, and the photoresist layer is a dry film photoresist.

Preferably, the step S4 includes: placing the first substrate under a photoresist roller, heating the first substrate to 70° C. to 100° C., and rotating the photoresist roller so that the photoresist film evenly adheres to the upper surface of a substrate to form the photoresist layer.

Preferably, the photoresist layer can be applied multiple times so that the total thickness of the photoresist layer is greater than 50 μm.

Preferably, softening the photoresist layer in step S5 includes: heating the first substrate in an environment of 60° C. to 120° C., with the heating time not exceeding 1 hour.

Preferably, removing the peaks formed during the softening process of the photoresist includes dissolving the peaks under the action of a developer through mask alignment photolithography.

Preferably, the curing temperature for curing the photoresist layer in step S6 is 150° C. to 200° C., and the curing time is 1 hour to 10 hours.

Preferably, the coating thickness of the adhesive material in step S71 is 10 μm to 90 μm, and the adhesive material is epoxy resin, polyester or polyurethane.

Preferably, the curing temperature of the PDMS material in step S72 is 50° C. to 100° C.

Based on the same inventive concept, the present disclosure also provides a microlens array.

Compared with the prior art, the beneficial effects of the invention at least include:

1. The working mold is directly produced through innovative methods, without the need to make a master mold, which reduces the mold turning process, reduces the complexity of the process, and reduces the cost at the same time;
2. In addition, the surface curvature of the subsequently formed microlens is adjusted through photoresist layers of different thicknesses, effectively expanding its application range;
3. By controlling the etching depth of the groove and the total thickness of the photoresist layer, the effect of flexibly controlling the sag of the microlens can be achieved.

Figure 1:
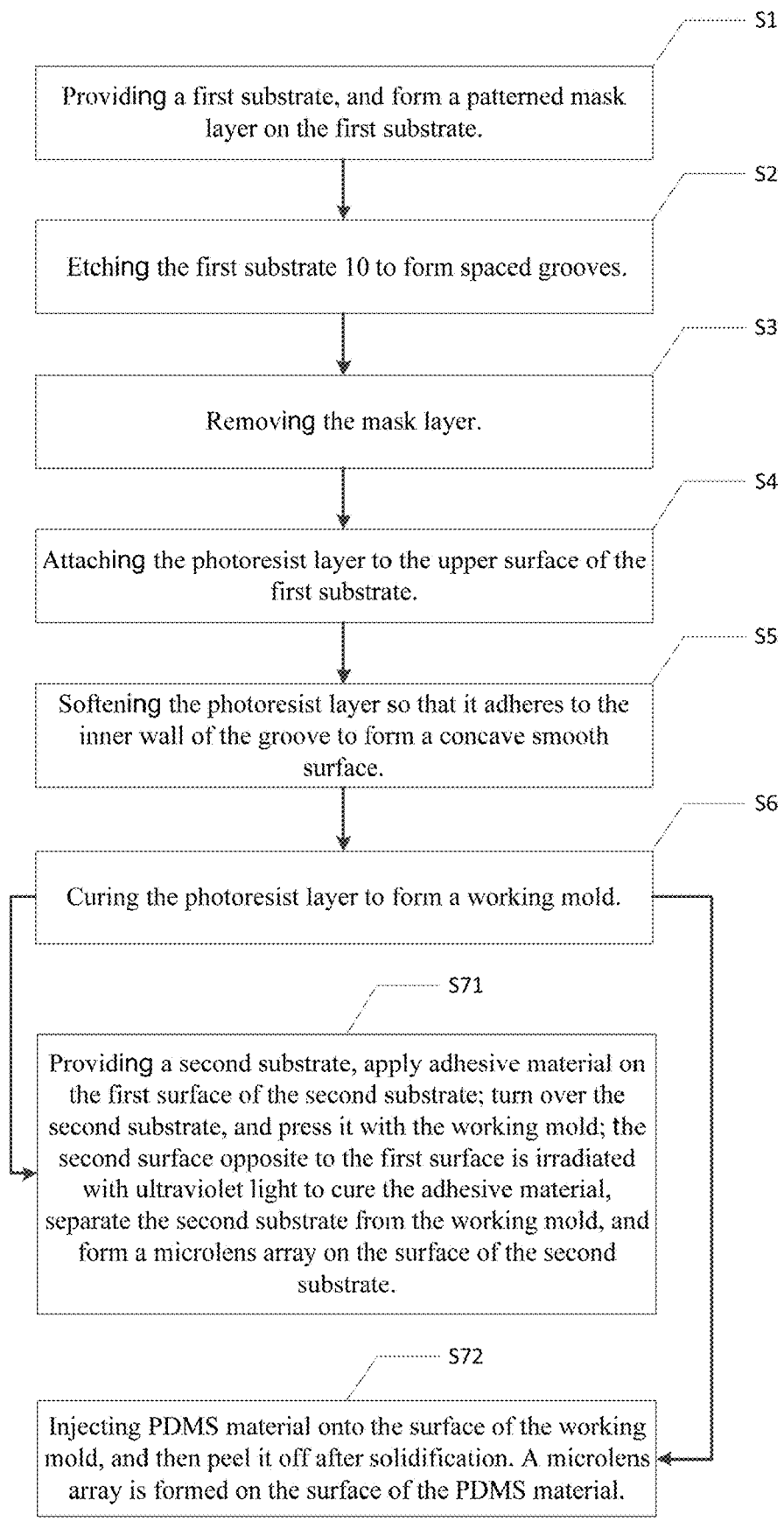
FIG. 1 illustrates a flow chart of a method for manufacturing a microlens array according to an embodiment of the invention.

Among them, the reference symbols are explained as follows:

10—first substrate, 20—mask layer, 30—groove, 40—photoresist roller, 50—photoresist layer, 60—second substrate, 71—rubber microlens array, 72—PDMS material microlens array.

DETAILED DESCRIPTION

The microlens array and its manufacturing method proposed by the present disclosure will be further described in detail below with reference to the accompanying drawings and specific embodiments. The advantages and features of the invention will become clearer from the following description. It should be noted that the drawings are in a very simplified form and use imprecise proportions, and are only used to conveniently and clearly assist in explaining the embodiments of the invention. In addition, the structures shown in the drawings are often part of the actual structure. In particular, each drawing needs to display different emphasis, and sometimes uses different proportions.

The present disclosure provides a method for manufacturing a microlens array. Referring to FIG. 1. FIG. 1 is a flow chart illustrating a method for manufacturing a microlens array according to an embodiment of the invention. The method for manufacturing a microlens array includes:

S1: Providing a first substrate 10, and forming a patterned mask layer 20 on the first substrate.

Figure 2:
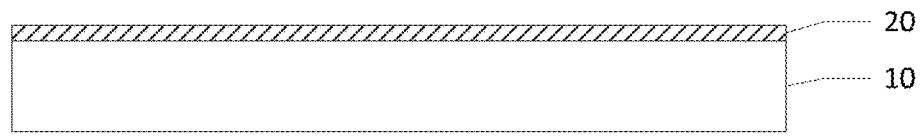
FIGS. 2-13 illustrate schematic structural diagrams of semiconductor devices in each process step of preparing a microlens array according to some embodiments of the invention.
Figure 3:
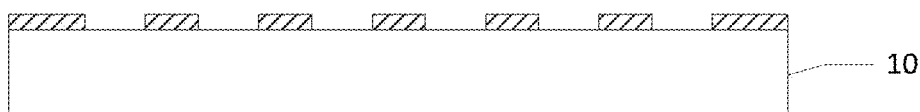

Referring to FIG. 2, a silicon substrate is provided, and photoresist is coated on the substrate to form a mask layer 20. The mask layer 20 has a thickness of 1 μm to 10 μm and is made of photoresist, silicon oxide, metal, or a combination thereof. Referring to FIG. 3, the mask layer 20 is exposed and developed so that the mask layer 20 in the area where the microlenses are located is removed.

S2: Etching the first substrate 10 to form spaced grooves 30.

Figure 4:
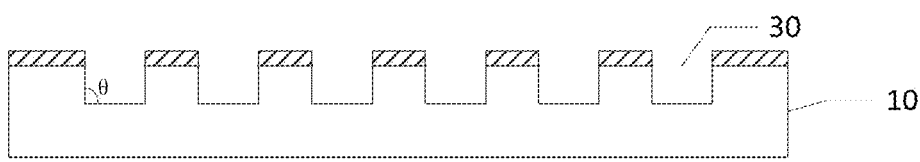

Referring to FIG. 4, the deep silicon etching (Deep Reactive Ion Etching, DRIE) process, that is, the deep reactive ion etching process, is used to etch the substrate. By alternating etching and passivation, the area where the microlens located is removed, forming a groove 30 with a certain depth;

Adjust the process parameters so that the angle θ of the side wall of the groove 30 relative to the bottom wall is adjusted between 80 and 100 degrees; the depth of the groove 30 in the vertical direction is 20 μm to 190 μm.

S3: Removing the mask layer 20.

Figure 5:
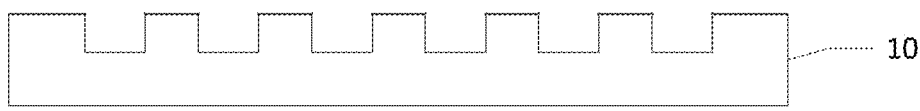

Solvent cleaning or wet etching is used to remove remaining photoresist, silicon oxide, metal and other mask layer 20 materials. Referring to FIG. 5, the first substrate 10 with grooves 30 is obtained.

S4: Attaching the photoresist layer 50 to the upper surface of the first substrate 10.

Figure 6:
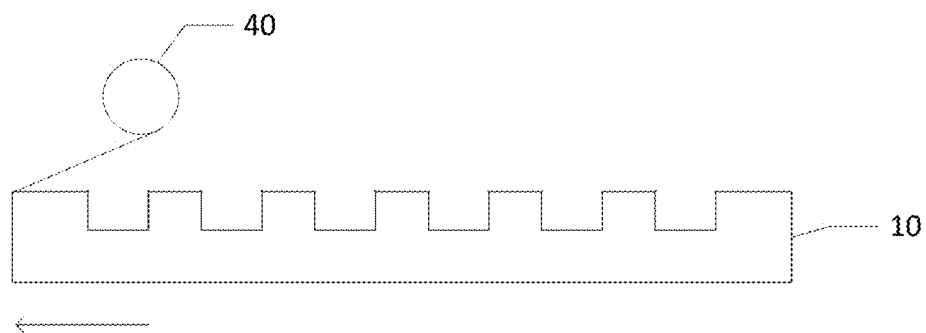
Figure 7:
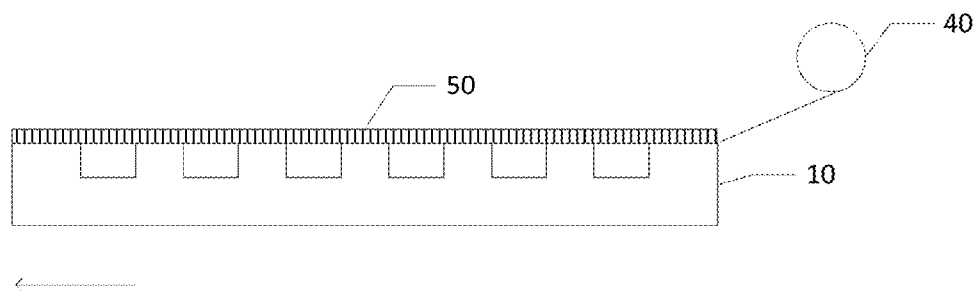

The photoresist layer 50 is made of dry film photoresist and has a thickness of 10 μm to 50 μm. Referring to FIG. 6, the first substrate 10 is placed under the photoresist roller 40, the first substrate 10 is heated to 70° C. to 100° C., and the photoresist roller 40 is rotated so that the first photoresist film evenly adheres to the upper surface of the substrate 10. Referring to FIG. 7, after the attachment is completed, the photoresist layer 50 is suspended above the groove 30 and supported by the side walls of the groove 30. Optionally, repeat the attaching operation of the photoresist film, and attach the photoresist film again on top of the photoresist film, so that the total thickness of the photoresist layer 50 exceeds 50 microns. The surface curvature of the subsequently formed microlens is adjusted through photoresist layers of different thicknesses to expand its application range.

S5: Softening the photoresist layer 50 so that it adheres to the inner wall of the groove 30 to form a concave smooth surface.

Figure 8:
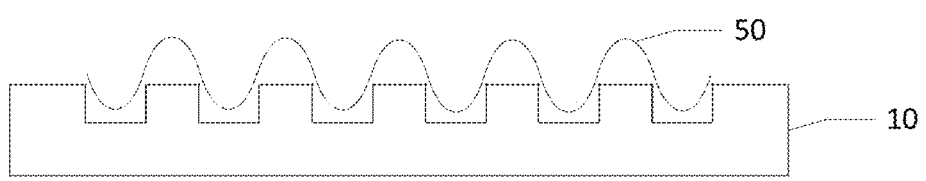

Referring to FIG. 8, the softening process of the photoresist layer 50 is: heating the first substrate 10 in an environment of 60° C. to 120° C. for no more than 1 hour. Heating can be carried out in a vacuum environment to remove bubbles and make the process more stable and repeatable.

During the softening process of the photoresist layer 50, a peak is formed above the first substrate 10. The photoresist at the peak is not cross-linked through mask alignment and photolithography, and the peak is dissolved under the action of the developer, forming a working prototype.

S6: Curing the photoresist layer 50 to form a working mold.

Figure 9:
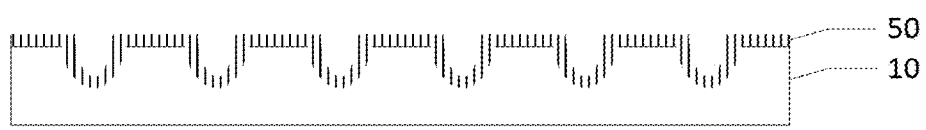

The photoresist layer 50 in step S5 is cured at high temperature. The curing temperature of the photoresist layer 50 is 150° C. to 200° C., and the curing time is 1 hour to 10 hours, so that the photoresist layer 50 and the first substrate 10 adhere tightly to form a whole, as shown in FIG. 9. Different from the traditional working mold production, this embodiment does not need to form the master mold first and then form the working mold, which reduces the mold turning process and reduces the complexity of the process.

S71: Providing a second substrate 60, applying adhesive material on the first surface of the second substrate 60; turning over the second substrate 60, and pressing it with the working mold; the second surface opposite to the first surface is irradiated with ultraviolet light to cure the adhesive material, separating the second substrate 60 from the working mold, and forming a microlens array 71 on the surface of the second substrate 60.

Figure 10:
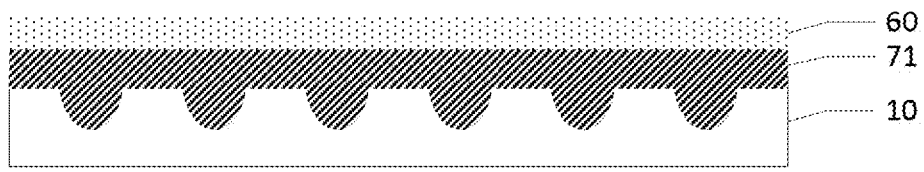
Figure 11:

The second substrate 60 is a transparent substrate made of glass, quartz, etc. UV curing refers to ultraviolet curing. The adhesive material can be epoxy resin, polyester, polyurethane, etc., and the coating thickness is 10 μm to 90 μm. Turning over the second substrate 60, fitting the spin-coated second substrate 60 to the working mold, applying pressure and then irradiate UV, and the ultraviolet light will cure the coated adhesive material through the second substrate, as shown in FIG. 10. After the second substrate 60 is separated from the working mold, the microlens array 71 is formed on the surface of the adhesive material on the second substrate 60, as shown in FIG. 11.

In another embodiment of the invention, after coating the adhesive material on the first surface of the second substrate 60, the working mold is turned over and pressed with the second substrate 60, facing the first surface of the second substrate 60. The second surface is irradiated with ultraviolet light to cure the adhesive material, and the second substrate 60 is separated from the working mold.

After step S6, step S72 may also be used to inject PDMS material onto the surface of the working mold, and then peel it off after solidification. A microlens array 72 is formed on the surface of the PDMS material.

Figure 12:
Figure 13:

The PDMS material is made of liquid prepolymer and cross-linking agent mixed in a certain ratio, and is injected onto the surface of the working mold, as shown in FIG. 12. The working mold with PDMS material injected is heated and cured in a vacuum state, and the curing temperature is 50° C. to 100° C. After the PDMS material is cured, it is peeled off from the working mold, and a microlens array 72 is formed on its surface, as shown in FIG. 13.

Example 1

A silicon substrate is provided, and photoresist is coated on the substrate to form a mask layer 20. The mask layer 20 has a thickness of 1 μm and is made of photoresist. The mask layer 20 is exposed and developed so that the mask layer 20 in the area where the microlenses are located is removed.

The DRIE process is used to etch the substrate, and the silicon substrate in the area where the microlens is located is removed by alternating etching and passivation to form a 20 μm deep groove 30. The side walls of the groove 30 are relative to the bottom wall. The angle θ is 80 degrees.

A solvent cleaning method is used to remove the remaining mask layer 20 material. A photoresist layer 50 is attached to the upper surface of the first substrate 10. The photoresist layer 50 is made of dry film photoresist and has a thickness of 10 μm. The first substrate 10 is placed under the photoresist roller 40, the first substrate 10 is heated to 70° C., and the photoresist roller 40 is rotated so that the upper surface of the first substrate 10 is uniformly adhered with the resist film. After the attachment is completed, the photoresist layer 50 is suspended above the groove 30 and supported by the side walls of the groove 30.

The first substrate 10 was heated in a 60° C. environment for 60 minutes under vacuum. During the softening process of the photoresist layer 50, a peak is formed above the first substrate 10. The photoresist at the peak is not cross-linked through mask alignment and photolithography, and the peak is dissolved under the action of the developer, forming a working prototype.

The photoresist layer 50 is cured at a high temperature of 150° C. for 10 hours, so that the photoresist layer 50 and the first substrate 10 are tightly bonded to form a whole.

A second substrate 60 is provided. The material is glass. A adhesive material with a thickness of 5 μm is coated on the first surface of the second substrate 60. The working mold is turned over and pressed with the second substrate 60. The second surface opposite to the first surface is irradiated with ultraviolet light to cure the adhesive material, separate the second substrate 60 from the working mold, and form a microlens array 71 on the surface of the second substrate 60.

Different from the traditional working mold production, this example does not need to form the master mold first and then form the working mold, which reduces the mold turning process and the complexity of the process. At this time, the sag height of the microlens is 10 μm. The sag height can be adjusted according to the depth of the groove in the vertical direction and the thickness of the photoresist, breaking through the limitations of the existing process.

Example 2

A silicon substrate is provided, and photoresist is coated on the substrate to form a mask layer 20. The mask layer 20 has a thickness of 5 μm and is made of photoresist. The mask layer 20 is exposed and developed to remove the mask layer 20 in the area where the microlenses are located.

The DRIE process is used to etch the substrate. By alternating etching and passivation, the silicon substrate in the area where the microlens is located is removed, forming a 90 μm deep groove 30. The side walls of the groove 30 are relative to the bottom wall. The angle θ is 90 degrees.

Wet etching is used to remove the remaining material of the mask layer 20. A photoresist layer 50 is attached to the upper surface of the first substrate 10. The photoresist layer 50 is made of dry film photoresist and has a thickness of 30 μm. The first substrate 10 is placed under the photoresist roller 40, the first substrate 10 is heated to 85° C., and the photoresist roller 40 is rotated so that the upper surface of the first substrate 10 is uniformly adhered with the resist film. After the attachment is completed, the photoresist layer 50 is suspended above the groove 30 and supported by the side walls of the groove 30.

The first substrate 10 was heated in a 90° C. environment for 30 minutes under vacuum. During the softening process of the photoresist layer 50, a peak is formed above the first substrate 10. The photoresist at the peak is not cross-linked through mask alignment and photolithography, and the peak is dissolved under the action of the developer, forming a working prototype.

The photoresist layer 50 is cured at a high temperature of 175° C. for a curing time of 5 hours, so that the photoresist layer 50 and the first substrate 10 are tightly bonded to form a whole body.

A second substrate 60 is provided. The material is glass. A adhesive material with a thickness of 70 μm is coated on the first surface of the second substrate 60. The working mold is turned over and pressed with the second substrate 60. The second surface opposite to the first surface is irradiated with ultraviolet light to cure the adhesive material, the second substrate 60 is separated from the working mold, and a microlens array 71 is formed on the surface of the second substrate 60.

Different from the traditional working mold production, this example does not need to form the master mold first and then form the working mold, which reduces the mold turning process and reduces the complexity of the process. At this time, the sag height of the microlens is 60 μm. The sag height can be adjusted according to the depth of the groove in the vertical direction and the thickness of the photoresist, breaking through the limitations of the existing process.

Example 3

A silicon substrate is provided, and photoresist is coated on the substrate to form a mask layer 20. The mask layer 20 has a thickness of 10 μm and is made of photoresist. The mask layer 20 is exposed and developed so that the mask layer 20 in the area where the microlenses are located is removed.

The DRIE process is used to etch the substrate. By alternating etching and passivation, the silicon substrate in the area where the microlens is located is removed, forming a 190 μm deep groove 30. The side walls of the groove 30 are relative to the bottom wall. The angle θ is 100 degrees.

A solvent cleaning method is used to remove the remaining mask layer 20 material. A photoresist layer 50 is attached to the upper surface of the first substrate 10. The photoresist layer 50 is made of dry film photoresist and has a thickness of 50 μm. The first substrate 10 is placed under the photoresist roller 40, the first substrate 10 is heated to 100° C., and the photoresist roller 40 is rotated so that the upper surface of the first substrate 10 is uniformly adhered with the resist film. The operation of attaching the photoresist film is repeated. The total thickness of the photoresist layer 50 is 100 microns. The surface curvature of the subsequently formed microlens is adjusted through photoresist layers of different thicknesses to expand its application range. After the attachment is completed, the photoresist layer 50 is suspended above the groove 30 and supported by the side walls of the groove 30.

The first substrate 10 was heated in a 120° C. environment for 10 minutes under vacuum. During the softening process of the photoresist layer 50, a peak is formed above the first substrate 10. The photoresist at the peak is not cross-linked through mask alignment and photolithography, and the peak is dissolved under the action of the developer, forming a working prototype.

The photoresist layer 50 is cured at a high temperature of 200° C. for 1 hour, so that the photoresist layer 50 and the first substrate 10 are tightly bonded to form a whole.

A second substrate 60 is provided. The material is glass. A adhesive material with a thickness of 90 µm is coated on the first surface of the second substrate 60. The working mold is turned over and pressed with the second substrate 60. The second surface opposite to the first surface is irradiated with ultraviolet light to cure the adhesive material, the second substrate 60 is separated from the working mold, and a microlens array 71 is formed on the surface of the second substrate 60.

Different from the traditional working mold production, this example does not need to form the master mold first and then form the working mold, which reduces the mold turning process and the complexity of the process. At this time, the sag height of the microlens is 90 µm. The sag height can be adjusted according to the depth of the groove in the vertical direction and the thickness of the photoresist, breaking through the limitations of the existing process.

Example 4

The previous steps of the preparation process in Example 1 are basically the same, except that there may be no need to use the second substrate 60, the PDMS material is directly injected into the surface of the working mold, and the working mold with the PDMS material injected is heated and solidified in a vacuum state. The curing temperature is 50° C. After curing, it is peeled off, and a microlens array 72 is formed on the surface of the PDMS material.

Different from the traditional working mold production, this example may not need to form the master mold first and then form the working mold, which reduces the mold turning process and reduces the complexity of the process. At this time, the sag height of the microlens is 10 µm. The sag height can be adjusted according to the depth of the groove in the vertical direction and the thickness of the photoresist, breaking through the limitations of the existing process.

Example 5

The previous steps of the preparation process of Example 2 are basically the same, except that there may be no need to use the second substrate 60, the PDMS material is directly injected into the surface of the working mold, and the working mold with the PDMS material injected is heated and solidified in a vacuum state. The curing temperature is 75° C. After curing, it is peeled off, and a microlens array 72 is formed on the surface of the PDMS material.

Different from the traditional working mold production, this example may not need to form the master mold first and then form the working mold, which reduces the mold turning process and the complexity of the process. At this time, the sag height of the microlens is 60 µm. The sag height can be adjusted according to the depth of the groove in the vertical direction and the thickness of the photoresist, breaking through the limitations of the existing process.

Example 6

The previous steps of the preparation process in Example 3 are basically the same. The difference is that there may be no need to use the second substrate 60, the PDMS material is directly injected into the surface of the working mold, and the working mold with the PDMS material injected is heated and solidified in a vacuum state. The curing temperature is 100° C. After curing, it is peeled off, and a microlens array 72 is formed on the surface of the PDMS material.

Figure 14:
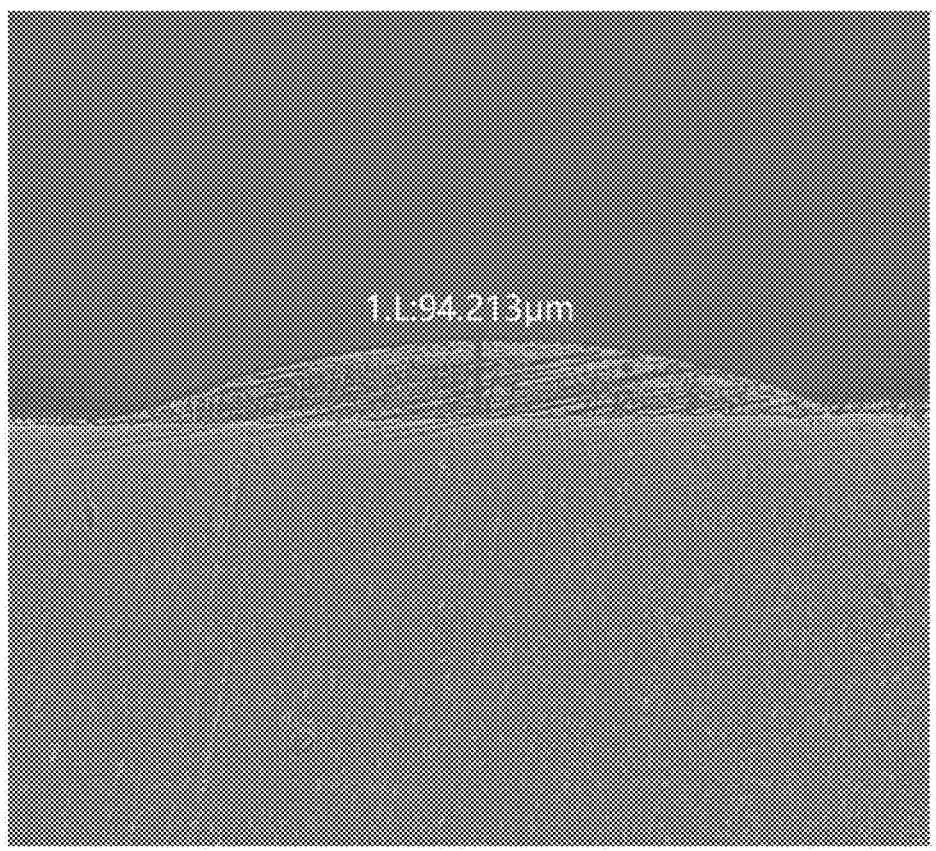
FIG. 14 illustrates a side cross-sectional imaging view of a microlens according to an embodiment of the invention.

Different from the traditional working mold production, this example may not need to form the master mold first and then form the working mold, which reduces the mold turning process and reduces the complexity of the process. The side-section imaging diagram is shown in FIG. 14. At this time, the sag height of the microlens is about 90 µm. The sag height can be adjusted according to the vertical depth of the groove and the thickness of the photoresist, breaking through the limitations of the existing process.

Figure 15:
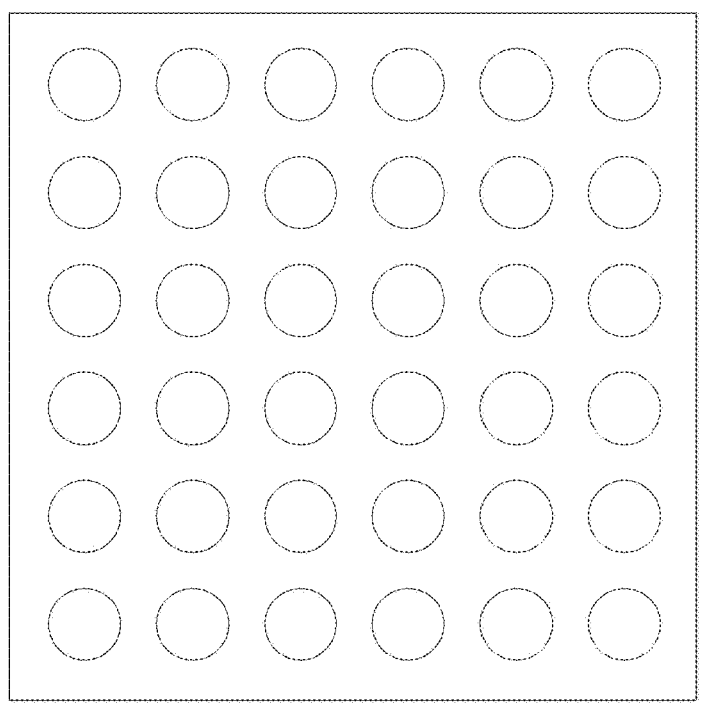
FIG. 15 illustrates a top view of a microlens array prepared according to an embodiment of the invention.

Based on the same inventive concept, the present disclosure also provides a microlens array, as shown in FIG. 15.

The above description is only a description of the preferred embodiments of the invention and does not limit the scope of the invention in any way. Any changes or modifications made by those of ordinary skill in the field of the invention based on the above disclosure shall fall within the scope of the claims.

What is claimed:

1. A method for fabricating a microlens array comprising:
    step S1, providing a first substrate, and forming a patterned mask layer on the first substrate;
    step S2, etching the first substrate to form spaced grooves;
    step S3, removing the patterned mask layer;
    step S4, attaching a photoresist layer to an upper surface of the first substrate;
    step S5, softening the photoresist layer to adhere to inner walls of the spaced grooves to form a concave smooth surface;
    step S6, curing the photoresist layer to form a working mold; and either of
    step S71 or step S72;
    wherein the step S71 includes: providing a second substrate, coating an adhesive material on the second substrate; turning the second substrate over, and pressing the second substrate against the working mold; ultraviolet (UV) curing the adhesive material, and separating the second substrate from the working mold, and forming the microlens array on a surface of the second substrate; and
    the step S72 includes: injecting a polydimethylsiloxane (PDMS) material into a surface of the working mold, peeling the PDMS material off after solidification, and forming the microlens array on a surface of the PDMS material.

2. The method for fabricating a microlens array according to claim 1, wherein a thickness of the patterned mask layer ranges from 1 μm to 10 μm, and a material of the patterned mask layer includes photoresist, silicon oxide, metal or a combination thereof.

3. The method for fabricating a microlens array according to claim 1, wherein the first substrate is made of silicon, and the step S2 utilizes a plasma deep silicon etching method to etch the first substrate, forming a groove with a vertical depth ranging from 20 μm to 190 μm and an inclination angle of a side wall of the groove relative to a bottom wall of the groove ranging from 80 to 100 degrees.

4. The method for fabricating a microlens array according to claim 2, wherein the step S3 uses solvent cleaning or wet etching to remove the patterned mask layer.

5. The method for fabricating microlens arrays according to claim 1, wherein the photoresist layer has a thickness ranging from 10 μm to 50 μm, and the photoresist layer is a dry film photoresist.

6. The method for fabricating a microlens array according to claim 1, wherein the step S4 includes: placing the first substrate under a photoresist roller, and heating the first substrate to a temperature ranging from 70° C. to 100° C., and rotating the photoresist roller so that the photoresist layer is evenly adhered to the upper surface of the first substrate to form the photoresist layer.

7. The method for fabricating a microlens array according to claim 6, wherein a photoresist is applied multiple times to form the photoresist layer, and a total thickness of the photoresist layer is greater than 50 μm.

8. The method for fabricating a microlens array according to claim 1, wherein the step S5 includes: heating the first substrate in an environment of 60° C. to 120° C. with a heating time not exceeding 1 hour.

9. The method for fabricating a microlens array according to claim 8, wherein the step S5 further includes removing peaks formed during the softening process of the photoresist layer by performing a photolithography process and dissolving tips of the peaks using a developer.

10. The method for fabricating a microlens array according to claim 1, wherein a curing temperature for curing the photoresist layer in the step S6 ranges from 150° C. to 200° C., and a curing time ranges from 1 hour to 10 hours.

11. The method for fabricating a microlens array according to claim 1, wherein a coating thickness of the adhesive material in the step S71 ranges from 10 μm to 90 μm, and the adhesive material is epoxy resin, polyester or polyurethane.

12. The method for fabricating a microlens array according to claim 1, wherein a curing temperature of the PDMS material in the step S72 ranges from 50° C. to 100° C.

* * * * *